Figure 1:
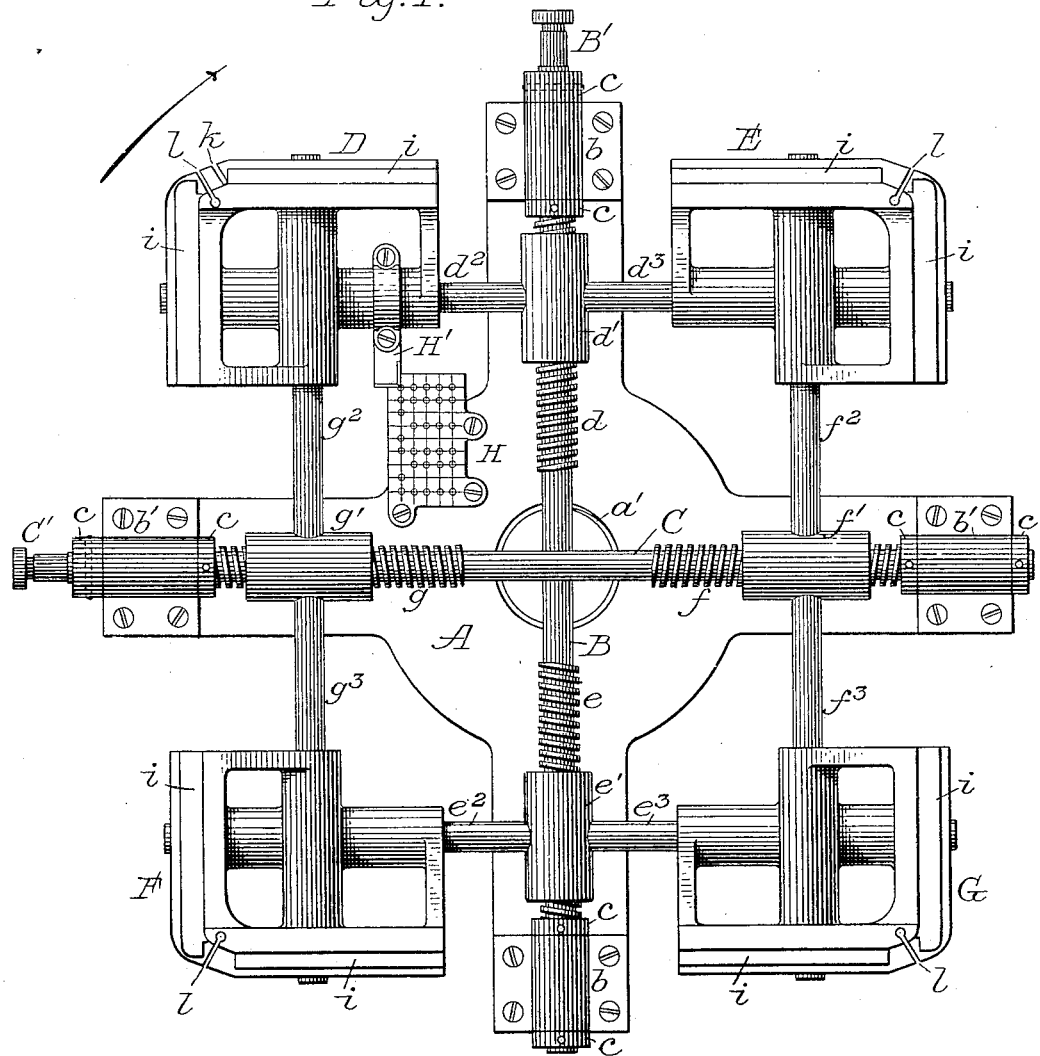

(No Model.) 2 Sheets—Sheet 1.

C. EICKEMEYER.
ARMATURE WINDING MACHINE.

No. 597,816. Patented Jan. 25, 1898.

Attest:
Howell Bartle
J. W. Searle

Inventor:
Carl Eickemeyer,
By Wm C. Wood
Attorney (No Model.) 2 Sheets—Sheet 2.

C. EICKEMEYER.
ARMATURE WINDING MACHINE.

No. 597,816. Patented Jan. 25, 1898.

Attest:
Howell Bartle
J. W. Searle

Inventor:
Carl Eickemeyer,
By Wm. C. Elwood
Attorney.

UNITED STATES PATENT OFFICE.

CARL EICKEMEYER, OF YONKERS, NEW YORK.

ARMATURE-WINDING MACHINE.

SPECIFICATION forming part of Letters Patent No. 597,816, dated January 25, 1898.

Application filed October 30, 1897. Serial No. 656,877. (No model.)

*To all whom it may concern:*

Be it known that I, CARL EICKEMEYER, of Yonkers, in the county of Westchester and State of New York, have invented certain new and useful Improvements in Armature-Winding Frames; and I do hereby declare that the following specification, taken in connection with the drawings furnished and forming a part of the same, is a clear, true, and complete description of my invention.

Broadly stated, the main object of my invention is to produce such rudimentary armature-coils as were described in United States Letters Patent No. 525,698, issued to my father, Rudolf Eickemeyer, September 11, 1894, for improvements in armatures for dynamo-electric machines, with special reference to a novel armature-winding. In said winding the wire coils are specially formed before being applied to the armature drum or core, and in a bipolar armature, for instance, said coils are counterparts in pairs, which calls for many different dimensions of coils. All of the coils are first developed from wire into a rudimentary form substantially rectangular in outline and having each turn or convolution of wire symmetrically disposed with relation to the others; and the special objects of my invention are to produce rudimentary coils with requisite accuracy, reasonable rapidity, and substantial economy, and requiring only comparatively unskilled workmen. My frame can also be employed for winding other rudimentary coils which are uniform in size and shape, in which case the frame may be readily adjusted for conformity with armatures of different sizes. For accomplishing these ends I have devised a winding-frame adapted to be used after the manner of a chuck on the spindle of a suitable lathe and embodying right and left hand adjusting-screws and coiling-plates rectangularly arranged and so organized that by the rotation of the screws the coiling-plates may be moved toward or from each other for varying either the width or the length of coils. I have also organized with the screws and coiling-plates an index or gage, appropriately lined and inscribed, which will enable any one to promptly adjust the winding-frame for producing any one of the numerous coils required for an armature of the dimensions for which the gage shall have been specially adapted.

For securing simplicity and economy in construction and ease and accuracy in operation my coiling-frame has four coiling-plates, which constitute the corners of the winding-frame, and each is slidably mounted upon rods which are at right angles to each other in different but parallel planes and which serve not only as supporting and guide rods for said plates, but also as portions of movable heads by which the plates are not only operatively coupled together, but also coupled by means of threaded sleeves or nuts to their appropriate pairs of screws. With this organization should the four coiling-plates be simultaneously moved by the rotation of all of the screws said plates would travel toward and from each other in radial lines; but should only either pair of right and left screws be rotated the plates operatively coupled thereto will be moved toward or from each other in lines parallel with said rotated screws, thus providing for the ready adjustment of the frame to meet all possible requirements.

For a more complete description of my invention I will refer to the accompanying drawings, in which—

Figure 2:
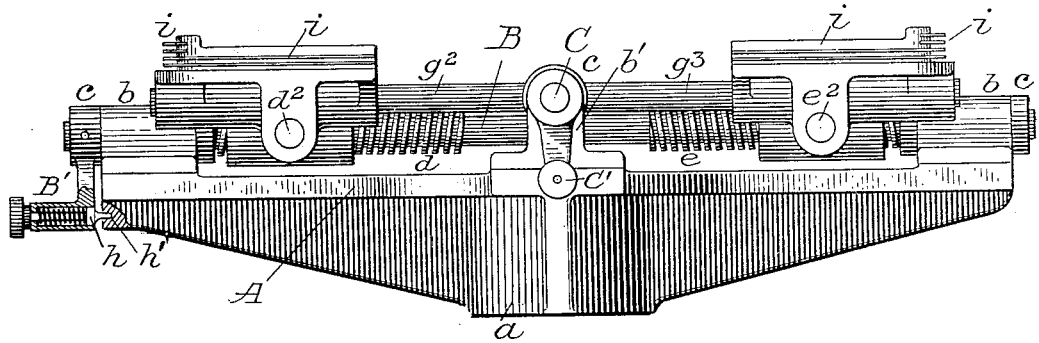
Figure 3:
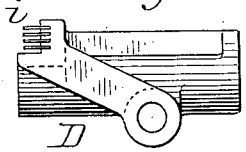
Figure 4:
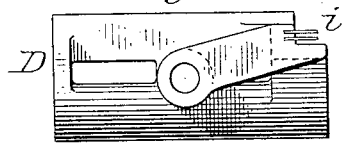
Figure 5:
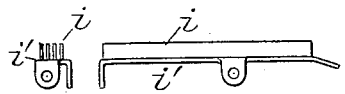
Figure 6:
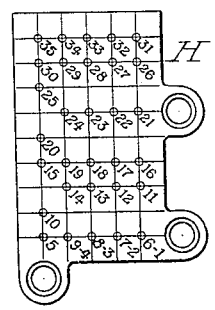

Figure 1 is a front or outside view of one of my frames. Fig. 2 is an edge view of the same. Figs. 3 and 4 illustrate the two inner ends of one of the coiling-plates. Fig. 5 illustrates a detachable face for application to a coiling-plate. Fig. 6 is an enlarged view of the index or gage employed for accurately adjusting the frame to the size of coil desired.

The foundation for the coiling-frame consists of a four-armed head-plate or chuck A, having at its rear side a central hub $a$, internally screw-threaded, as at $a'$, for enabling it to be properly mounted upon the screw usually provided on the end of the spindle of such a lathe as would be well known to be suitable for coil-winding operations.

Upon each of the four arms of the chuck, at their outer ends, there is a radial journal-bearing, two of which, $b\ b$, lie closer to the face of the chuck than the other two at $b'\ b'$, so as to properly receive the journals of the two shafts B and C, which being at right angle to and crossing each other at the center occupy different planes. Each shaft is provided with pinned collars $c$ at the ends of the bearings for preventing longitudinal movement. Upon each of said shafts there are right and left hand screws, those on shaft B being designated $d$ and $e$ and those on shaft C designated $f$ and $g$. Upon each of said screws there is a threaded sleeve or nut respectively designated $d'$, $e'$, $f'$, and $g'$, and each of said sleeves is provided with oppositely-projecting rods occupying planes parallel with the face of the chuck, each two rods and their sleeve in each instance constituting a cross-head movable in either direction, according to the rotation of its screw. Mounted upon said cross-head rods there are four coiling-plates D, E, F, and G, which afford a rectangular outline and constitute the movable corners of a rectangular frame. Each coiling-plate has two guide-bearings at right angles to each other, but in different planes, for the reception of their appropriate cross-head rods. The coiling-plate D is traversed by the rods $d^2$ and $g^2$, the plate E by rods $d^3$ and $f^2$, the plate F by rods $g^3$ and $e^2$, and the plate G by rods $e^3$ and $f^3$, said rods affording reliable supports for the plates and always maintaining them in appropriate relations to each other as corners of the frame. It will be seen that the simultaneous rotation of all the screws will cause all of the plates to move toward or from each other in lines radiating from the center, in which case all of the threaded sleeves and their rods will serve as cross-heads, but that if but one shaft and pair of screws be rotated only two of said sleeves and their rods will serve as cross-heads, while the rods of the other sleeves will serve only as guide-rods upon which the moved plates will freely slide and be accurately guided in lines parallel with the line of the rotated screws.

Each of the shafts B and C is provided with a crank, as at B' and C', and within each crank-handle there is a spring-actuated stop-pin $h$, the inner projecting end of which, by occupying a hole or seat $h'$ in the end of an arm of the chuck, enables each pair of screws to be locked in position after each adjustment. These screws in this instance are so proportioned that one revolution will move the coiling-plates coupled thereto the exact distance required in changing from one coil dimension to the next larger or smaller, and the locking-pin on the cranks assure an exact rotation as well as to confine the coiling-plates in their adjusted positions.

The winding or coiling of the wire is effected at the outer edges of the coiling-plate, and therefore each plate is provided with means which will assure the desired spiraling of the wire and the building up of a coil having many convolutions, and said means may be either appropriate grooves in the outer edges or faces of the coiling-plates or thin webs $i$, inserted in suitable grooves, as indicated in Fig. 2, or such webs may be provided on a face-plate $i'$, as indicated in Fig. 5, said plate having ears and suitable holes for the reception of screws for fastening them to the coiling-plates and enabling such web-plates to be readily applied to the coiling-plates or removed for applying others of different size or arrangement.

A prompt and accurate adjustment of the frame, even by a comparatively unskilled workman, is provided for in the index or gage H, which will of course be specially adapted for the line of duty required—as, for instance, the gage shown is specially intended for use in the production of rudimentary coils of the character described in the hereinbefore-mentioned Letters Patent.

As shown in Fig. 6, the face of the index or gage is appropriately lined at right angles, and the various points of adjustment are indicated by appropriate numbers corresponding to an appropriate numerical designation of the several coils required for covering a seventy-coil armature. Four of the gage-points bear two numbers each—as, for instance, 6 and 1, 7 and 2, &c.—because coils 1 and 6 and 2 and 7, for instance, can be the same size and form, and they are required in pairs, thus providing for sixteen of the seventy coils, the other fifty-four being provided for in pairs by the twenty-seven other gage-points at 5 and those at 10 to 35, inclusive.

The coiling-plate D has secured thereto a gage-pointer H', which by an appropriate manipulation of the screws may be promptly located at any one of the gage-points, and after locking the screws the winding or coiling operation may be commenced, the initial end of the insulated wire having been first inserted into the holding-slot $k$ in the coiling-plate D, and the frame revolved in the direction of the arrow.

The grooves or webs shown are adapted to lay the wire in several layers of four convolutions each, and preferably so that the two terminals will be adjacently located for facilitating their coupling on an armature-commutator. After completing the winding the wire is firmly bound by means of cord, readily applied through the cording-slots $l\ l\ l\ l$ at the corners or angles of the coiling-plates.

Having thus described my invention, I claim as new and desire to secure by Letters Patent—

1. In a winding-frame for producing armature-coils, the combination with a suitable chuck or head-plate, of four angular coiling-plates arranged to afford a rectangular outline and four right and left hand screws coupled together in pairs, and operatively coupled to said coiling-plates for varying the relative positions of said plates according to the size of coil desired, substantially as described.

2. In a winding-frame, the combination with a suitable head-plate, of four right and left hand screws, coupled together in pairs at right angles to each other, a nut or threaded sleeve on each screw, oppositely-projecting rods on each sleeve, and four coiling-plates affording a rectangular outline, and each having slide-bearings for two of said rods and each operatively coupled by said rods to two of said screws which are at right angles to each other, substantially as described.

3. In a winding-frame, the combination of four coiling-plates rectangularly arranged, and screws which are operatively coupled to said plates, are proportioned so that one rotation thereof will move said plates from the position required for a coil of one size to one next larger or smaller, and stops which lock the screws in position after each complete rotation, substantially as described.

4. In a winding-frame for producing coils the combination with four coiling-plates, and screws for actuating them, of a gage-plate appropriately inscribed according to the various coils desired and traversed by a pointer carried by one of said plates, substantially as described.

CARL EICKEMEYER.

Witnesses:
GEO. EICKEMEYER,
O. B. WARING.